United States Patent [19]
Barbazza

[11] Patent Number: 5,915,876
[45] Date of Patent: Jun. 29, 1999

[54] PACKETS FORMED BY THE JUNCTION OF A PLURALITY OF SHEETS IN PLASTIC MATERIAL SHAPED IN RELIEF, FOR THE REALIZATION OF PROTECTION BARRIERS FOR IMPACT ABSORPTION, ESPECIALLY FOR MOTOR CAR OR CYCLE COURSES

[75] Inventor: Fabrizio Barbazza, Monza, Italy

[73] Assignee: Filling Italiano S.r.l., Milan, Italy

[21] Appl. No.: 08/956,770

[22] Filed: Oct. 22, 1997

Related U.S. Application Data

[63] Continuation of application No. 08/493,961, Jun. 23, 1995, abandoned.

[30] Foreign Application Priority Data

Jun. 30, 1994 [IT] Italy ................................. MI94A1369

[51] Int. Cl.$^6$ .................................................. E01F 15/08
[52] U.S. Cl. .............................................. 404/6; 188/377
[58] Field of Search .................... 404/6, 9, 10; 256/13.1; 188/377; 206/521, 591; 293/120, 122, 133; 280/751, 752

[56] References Cited

U.S. PATENT DOCUMENTS

| | | | |
|---|---|---|---|
| 3,930,665 | 1/1976 | Ikawa | 188/377 X |
| 3,944,187 | 3/1976 | Walker | 188/377 X |
| 4,221,413 | 9/1980 | Bonnetain | 188/377 X |
| 4,227,593 | 10/1980 | Bricmont et al. | 188/377 |
| 4,321,989 | 3/1982 | Meinzer | 188/377 |
| 5,435,619 | 7/1995 | Nakae et al. | 296/189 |

FOREIGN PATENT DOCUMENTS

| | | | |
|---|---|---|---|
| 446174 | 6/1927 | Germany | 293/133 |
| 4131937 | 4/1993 | Germany | 256/13.1 |

*Primary Examiner*—James A. Lisehora
*Attorney, Agent, or Firm*—Notaro & Michalos P.C.

[57] ABSTRACT

Elements for impact absorption for the realization of protection barriers for motor car or cycle courses, formed by the junction of a plurality of sheets of plastic material, shaped in such a way as to present a series of reliefs or corrugations, superimposed so that two contiguous sheets present facing concavities and are joined through welding, sticking or other means.

1 Claim, 14 Drawing Sheets

PACKETS FORMED BY THE JUNCTION OF A PLURALITY OF SHEETS IN PLASTIC MATERIAL SHAPED IN RELIEF, FOR THE REALIZATION OF PROTECTION BARRIERS FOR IMPACT ABSORPTION, ESPECIALLY FOR MOTOR CAR OR CYCLE COURSES

This application is a continuation, of application Ser. No. 08/493,961, filed Jun. 23, 1995, now abandoned.

FIELD AND BACKGROUND OF THE INVENTION

This invention refers to the use of packets formed by the junction of a plurality of sheets in plastic material, shaped in relief, laid one upon the other and welded together, for the realization of protection barriers for impact absorption, especially for motor car and cycle courses.

These packets are realized by shaping sheets in plastic material in such a way as to produce ribs and/or hollow protruding parts, superimposing them so that these protruding parts lean against the protruding parts of the contiguous sheet, in order to realize empty spaces between these sheets, and then welding the sheets together, in order to obtain a packet of considerable thickness that in case of impact plastically warps, absorbing gradually the kinetic energy and softening the impact. The elements according to the invention are, thanks to their characteristics, especially suitable for the realization of protection barriers both for motor car courses and for motor cycle courses.

As it is known, one of the most severe problems in the organization of motor contests is the safety problem, both for drivers and public.

As far as the course safety is concerned, during the years many solutions have been proposed in the attempt to realize barriers able to assure an appropriate protection to both public and drivers.

The rigid barriers, generally formed by guardrails or by a wall in reinforced concrete, often completed with a net of appropriate height, show themselves effective for the protection of the public but often dangerous for the safety of the drivers.

This kind of barrier, in fact, is suitable only when the impact angle between vehicle and wall is little enough to allow the vehicle to slide along the barrier, that gradually slackens its speed.

In case of frontal impacts, however this solution is extremely dangerous.

For a certain period of time barriers were used formed by straw bales leaned against rigid barriers, with a certain improvement with reference to the previous barriers, as a certain possibility of compliance, that lessens the violence of a frontal impact, is associated to a low coefficient of tangential friction, that helps the sliding along the barrier itself.

This solution showed to be of a certain utility only in case of motor cycle tracks and did not show an appropriate level of protection in case of impact of a racing car.

Also in case of motor cycle courses, besides, the effectiveness of these barriers could be furtherly improved if it were possible to increase the compliance transversely.

More over, the straw bales show other inconveniences as for instance the inflammability of the material.

Another kind of barriers often used in motor car courses is formed by a series of tires leaned against a rigid barrier and fastened with ropes.

The tire barriers yield more than the previous ones, but show two serious inconveniences: on the one hand there is in fact the risk that this barrier opens, entrapping the vehicle and/or the driver, who cannot slide but must stop, on the other hand the ability of this material to get elastically deformed, tending to return part of the energy absorbed during the impact, lets the vehicle rebound again to the middle of the track, with the consequent seriously dangerous situation.

Recently protection barriers were proposed formed by a series of containers in a material capable of being deformed, for instance in plastic material, joined together and partially filled with water.

These barriers show a compliance comparable to the compliance of the tires, with the advantage to have a smooth surface with low friction, that allows the vehicle to slide along it.

But also this method is inadequate in case of frontal impact because these containers, compressed in consequence of the impact, return then elastically to the initial position, repelling the vehicle and/or the driver towards the track.

SUMMARY OF THE INVENTION

There is therefore a lively demand in the field of safety means and in particular of barriers that on the one hand are able to absorb with a certain graduality the energy deriving from the impact with a vehicle, warping however plastically in order to avoid the rebound back of the vehicle, and that show a sufficiently smooth surface to allow in case of impact with a low angle of incidence, the vehicle to slide along the barrier, slackening in this way the speed till the stop.

During a series of studies about this matter, the inventor supposed, and the following accomplished tests confirmed this hypothesis, that it was possible to obtain good results with a barrier formed by packet of sheets in plastic material, the sheets being shaped in such a way as to show a series of concavities and convexities and joined for instance through welding, sticking or other known method in order to realize elements able to plastically warp, absorbing gradually the impact and avoding in this way the risk to repel the vehicle again towards the track.

Packets of sheets in plastic material of this kind are already known, used however in a completely different field, for the realization of packets for heat-exchange in evaporation towers.

These packets in evaporation towers are formed by corrugated sheets in plastic material, superimposed in such a way as to present facing concavities and convexities, superimposed and joined through welding or sticking, in such a way as to obtain a kind of little mattress which in case of impact warps, absorbing the kinetic energy the vehicle transmitted.

BRIEF DESCRIPTION OF THE DRAWINGS

This invention is now described in details, with reference to the enclosed figures, where.

DESCRIPTION OF THE PREFERRED EMBODIMENTS

Figure 1:
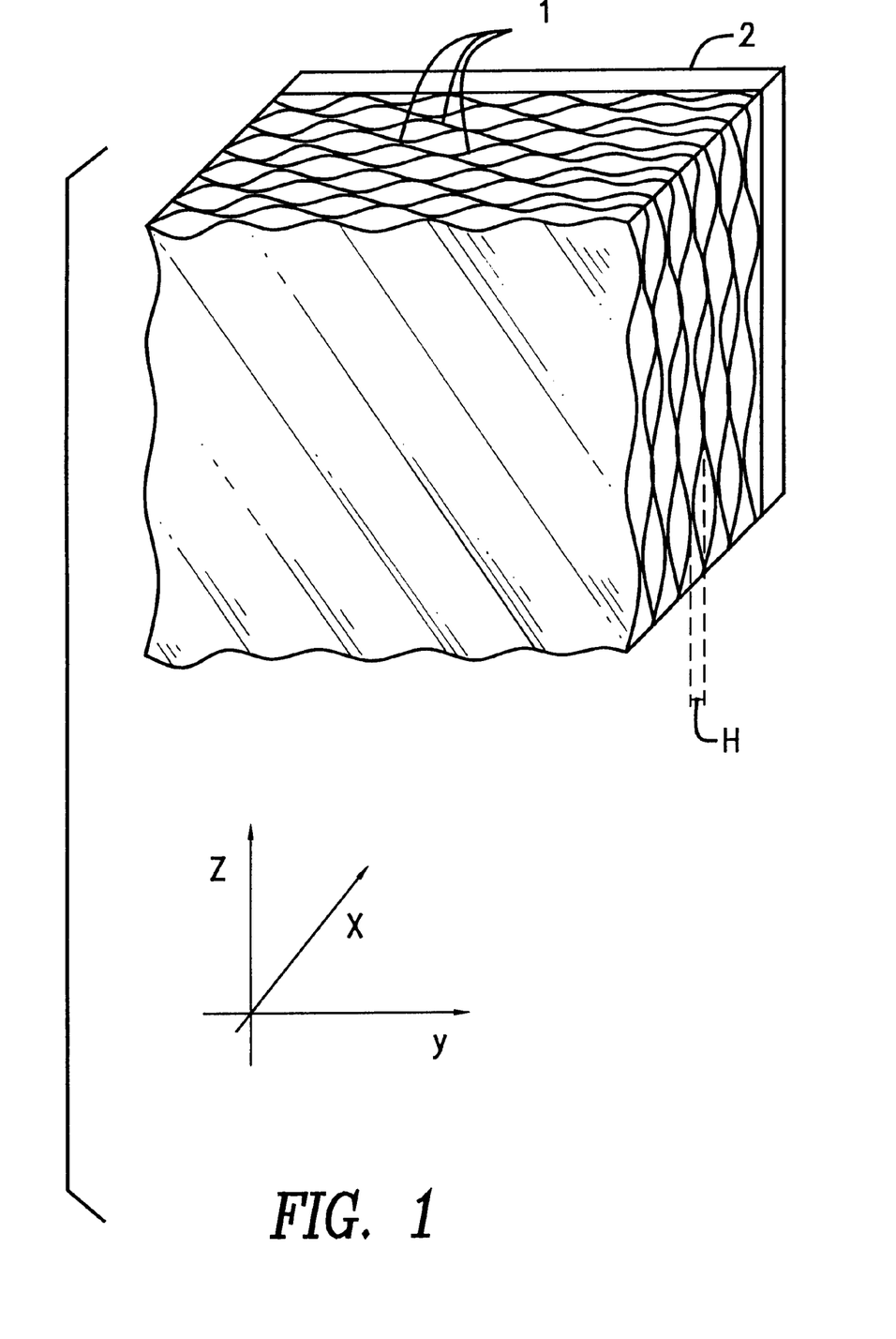
FIG. 1 illustrates in section a packet for the realization of elements for impact absorption according to the invention.

With reference to the figure, the protection elements according to the invention are formed by the junction of a plurality of sheets 1 in plastic material with an adequate thickness, for instance in PVC or similar, shaped, for instance pressed under vacuum in such a way as to present a series of corrugations or convexities and concavities in order to give to the sheet a certain height "H", noticeably greater than the thickness of the platic sheet.

Preferably the used material shall be of self-extinguishing type. These sheets are then superimposed so that the corrugations have facing concavities, in order to realize a kind of honeycomb packet or similar, as illustrated in the detail of the figure, and to obtain a little mattress of an adequate thickness.

The little mattresses are then joined, for instance are placed side by side and binded with a sheet 2 in plastic material or similar, or sticked through ropes or other appropriate system in order to realize a barrier for the impact absorption to be placed at the sides of the track of a course, leaning them against a rigid barrier or other fixed support element.

The junction of these protection elements allows to realize a barrier with an almost continous, smooth surface, able to allow a vehicle to slide along it, with the advantage however that in case of frontal impact or with an almost high angle of incidence the packet of plastic sheets warps and, thanks to the following collapse of the corrugations or of the reliefs of the sheets that form it, absorbs gradually the impact energy, elastically warping. The deformation of the element for the impact absorption happens according to a curve that varies in function of the thickness of the sheets and of the type of shape given to them.

Many tests were executed using these packets formed by the junction of sheets in plastic material, shaped in such a way as to present a series of corrugations.

For these tests, samples were realized with dimensions 30×30×30, using packets formed by the junction of corrugated sheets with shapes of different dimensions, different thickness and corrugations of different height. The typical dimensions of the samples are reported in the following summary table, where also the apparent specific weight of the samples are specified (the relationship between weight and volume calculated on the outer dimensions) and the "equivalent" area, that is the area approximately estimated looking at the sample in direction z.

TABLE 1

| No. SAMPLE | SAMPLE KIND | Lx cm | Ly cm | Lz cm | TOTAL VOLUME cm. cu. | WEIGHT g | APPARENT DENSITY g.l. | EQUIVALENT AREA sq/cm. | AREA "X" sq.cm. Ly*Lz |
|---|---|---|---|---|---|---|---|---|---|
| 1 | CORROG. 27/70 | 33.00 | 30.00 | 30.00 | 29700.00 | 1314.00 | 44.24 | 660.00 | 900.00 |
| 2 | CORROG. 27/70 | 33.00 | 30.00 | 30.00 | 29100.00 | 1315.00 | 44.28 | 780.00 | 900.00 |
| 3 | CORROG. 27/70 | 33.00 | 29.00 | 30.00 | 28710.00 | 1278.00 | 44.51 | 575.00 | 870.00 |
| 4 | CORROG. 20/50 | 31.00 | 30.00 | 30.00 | 27900.00 | 855.00 | 30.65 | 754.00 | 900.00 |
| 5 | CORROG. 20/50 | 31.00 | 30.00 | 30.00 | 27900.00 | 844.00 | 30.25 | 754.00 | 900.00 |
| 6 | CORROG. 20/50 | 31.00 | 30.00 | 30.00 | 27900.00 | 833.00 | 29.86 | 754.00 | 900.00 |
| 7 | CORROG. 20/33 | 30.50 | 30.00 | 30.00 | 27450.00 | 581.00 | 21.17 | 900.00 | 900.00 |
| 8 | CORROG. 20/33 | 30.50 | 30.00 | 30.00 | 27450.00 | 595.00 | 21.68 | 841.00 | 900.00 |
| 9 | CORROG. 20/33 | 30.50 | 30.00 | 30.00 | 27450.00 | 575.00 | 20.95 | 812.00 | 900.00 |
| 10 | CORROG. 20/28 | 30.00 | 30.00 | 29.50 | 26550.00 | 443.00 | 16.69 | 784.00 | 885.00 |
| 11 | CORROG. 20/26 | 30.50 | 29.50 | 29.50 | 26542.63 | 438.00 | 16.50 | 756.00 | 870.25 |
| 12 | CORROG. 20/26 | 30.00 | 30.00 | 29.50 | 26550.00 | 435.00 | 16.38 | 841.00 | 885.00 |
| 13 | CORROG. 20/100 | 24.50 | 30.00 | 30.00 | 22050.00 | 1356.00 | 61.50 | 783.00 | 900.00 |
| 14 | CORROG. 20/100 | 24.50 | 29.00 | 29.50 | 20959.75 | 1346.00 | 64.22 | 812.00 | 855.50 |
| 15 | CORROG. 20/100 | 24.50 | 29.00 | 29.50 | 20959.75 | 1336.00 | 63.74 | 812.00 | 855.50 |
| 16 | CORROG. 13/70 | 31.50 | 30.00 | 29.50 | 27877.50 | 1775.00 | 63.67 | 841.00 | 885.00 |
| 17 | CORROG. 13/70 | 31.50 | 30.00 | 29.50 | 27877.50 | 1737.00 | 62.31 | 812.00 | 885.00 |
| 18 | CORROG. 13/70 | 31.50 | 30.00 | 29.50 | 27877.50 | 1774.00 | 63.64 | 841.00 | 885.00 |
| 19 | CORROG. 13/50 | 31.00 | 30.00 | 30.00 | 27900.00 | 1260.00 | 45.16 | 841.00 | 900.00 |
| 20 | CORROG. 13/50 | 31.00 | 30.00 | 30.00 | 27900.00 | 1251.00 | 44.84 | 841.00 | 900.00 |
| 21 | CORROG. 13/50 | 31.00 | 30.00 | 30.00 | 27900.00 | 1248.00 | 44.73 | 841.00 | 900.00 |
| 22 | CORROG. 13/33 | 30.50 | 30.00 | 29.00 | 26535.00 | 847.00 | 31.92 | 841.00 | 870.00 |
| 23 | CORROG. 13/33 | 30.50 | 30.00 | 29.00 | 26535.00 | 831.00 | 31.32 | 841.00 | 870.00 |
| 24 | CORROG. 13/33 | 30.50 | 30.00 | 29.00 | 26535.00 | 834.00 | 31.43 | 812.00 | 870.00 |
| 25 | CORROG. 13/26 | 30.50 | 30.50 | 28.50 | 26512.13 | 677.00 | 25.54 | 783.00 | 869.25 |
| 26 | CORROG. 13/26 | 29.50 | 31.00 | 30.00 | 27435.00 | 685.00 | 24.97 | 841.00 | 930.00 |
| 27 | CORROG. 13/26 | 30.00 | 31.00 | 29.50 | 27435.00 | 704.00 | 25.66 | 841.00 | 914.50 |
| 28 | CORROG. 6/26 | 19.00 | 30.00 | 30.00 | 17100.00 | 751.00 | 43.92 | 900.00 | 900.00 |
| 29 | CORROG. 6/26 | 30.50 | 29.50 | 30.00 | 26992.50 | 1190.00 | 44.09 | 885.00 | 885.00 |
| 30 | CORROG. 6/26 | 29.50 | 30.00 | 30.00 | 26550.00 | 1144.00 | 43.09 | 900.00 | 900.00 |

The directions x, y, z are represented by the Cartesian axes illustrated in FIG. 1.

Finally, the table definition "corrugation 27/70" in the column "Kind of sample" specifies that the sheets forming the packet are sheets in corrugated plastic material, where the height of the corrugation is 27 mm and the thickness of the sheetis 70 hundredths of mm and so on.

In order to preliminarily define the ability of impact absorption of these hand-manufactured elements, a series of static tests was executed in order to draw the solicitation and compression diagrams in function of the deformation.

These tests pointed out maximum collapse solicitation at about 1 kg/sq cm with the best results obtained for the kinds "corrugations 13/70", "corrugations 13/50" and "corrugations 20/100".

A theoretic comparison between these data and the kinetic energy a F1 car has in the event of an impact at the normal speed of 100 km/h points out the necessity of thicknesses of 1.5–2.5 m of protection with packets of the kind "corrugations 13/70".

The analogous theoretic calculation in the event of a human body with a speed of 70 km/h points out the necessity of a thickness of 1–1.5 m of protection with packets of the kind "corrugations 13/33".

The results of the compression tests executed on the samples are illustrated in the diagrams of the FIGS. 5 to 14.

In order to facilitate the understanding of these diagrams the obtained curves were traced in a schematic way, with partially linear trends, eliminating the oscillation of the charge due to local yielding.

Figure 2:
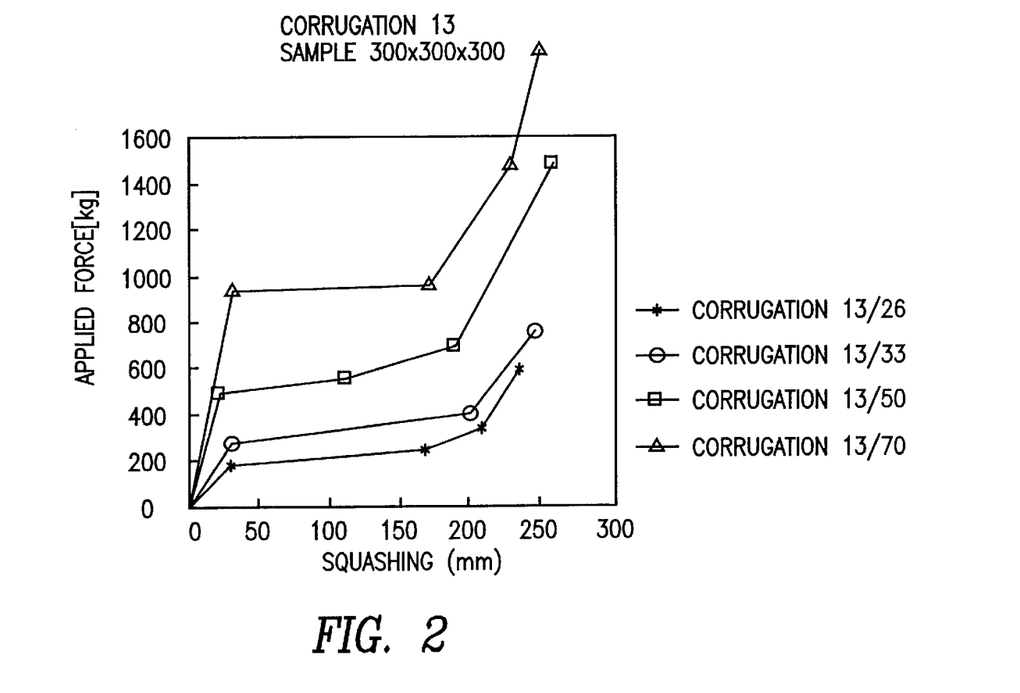
FIGS. 2 to 4 are diagrams that illustrate in a schematic way the deformation curves of the elements according to the invention.
Figure 3:
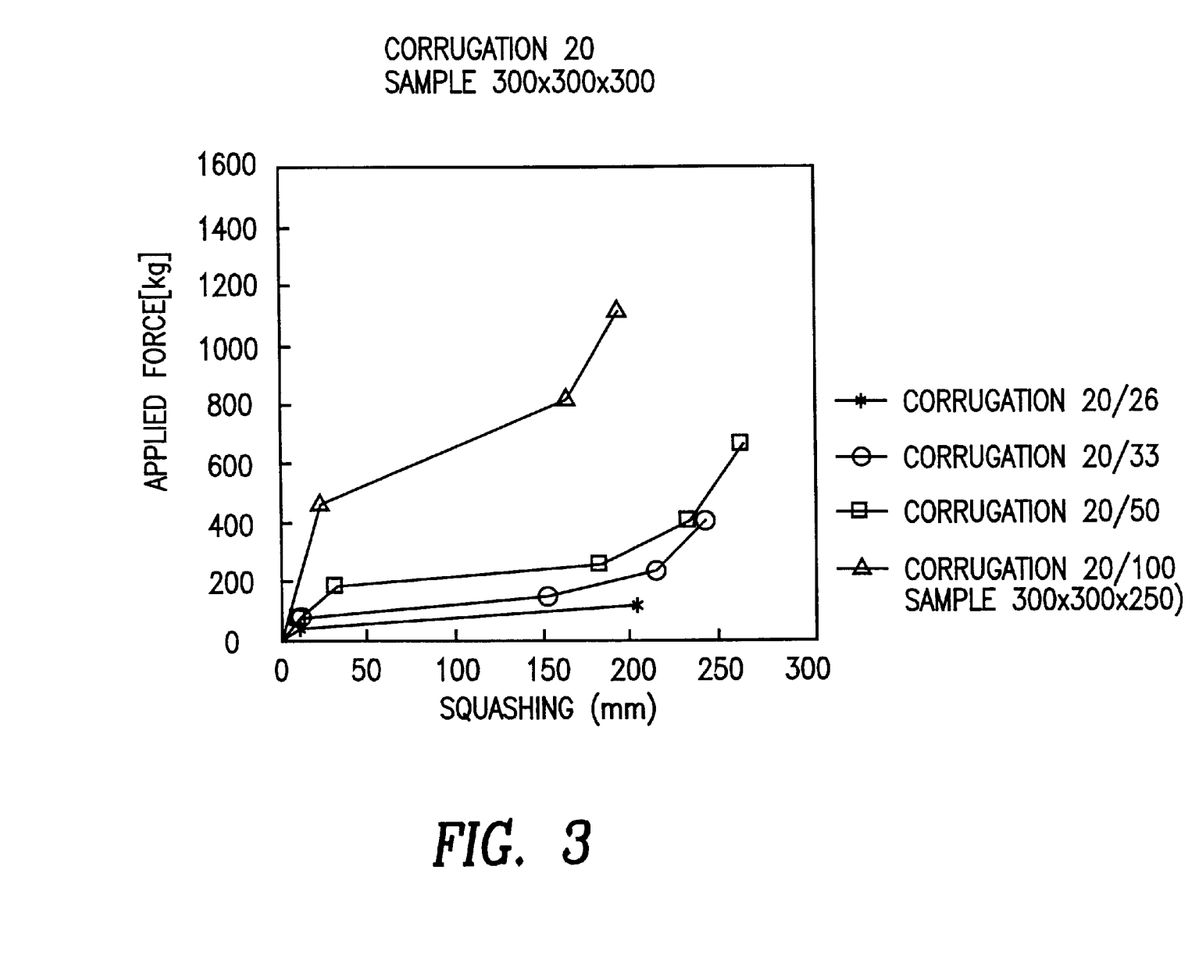
Figure 4:
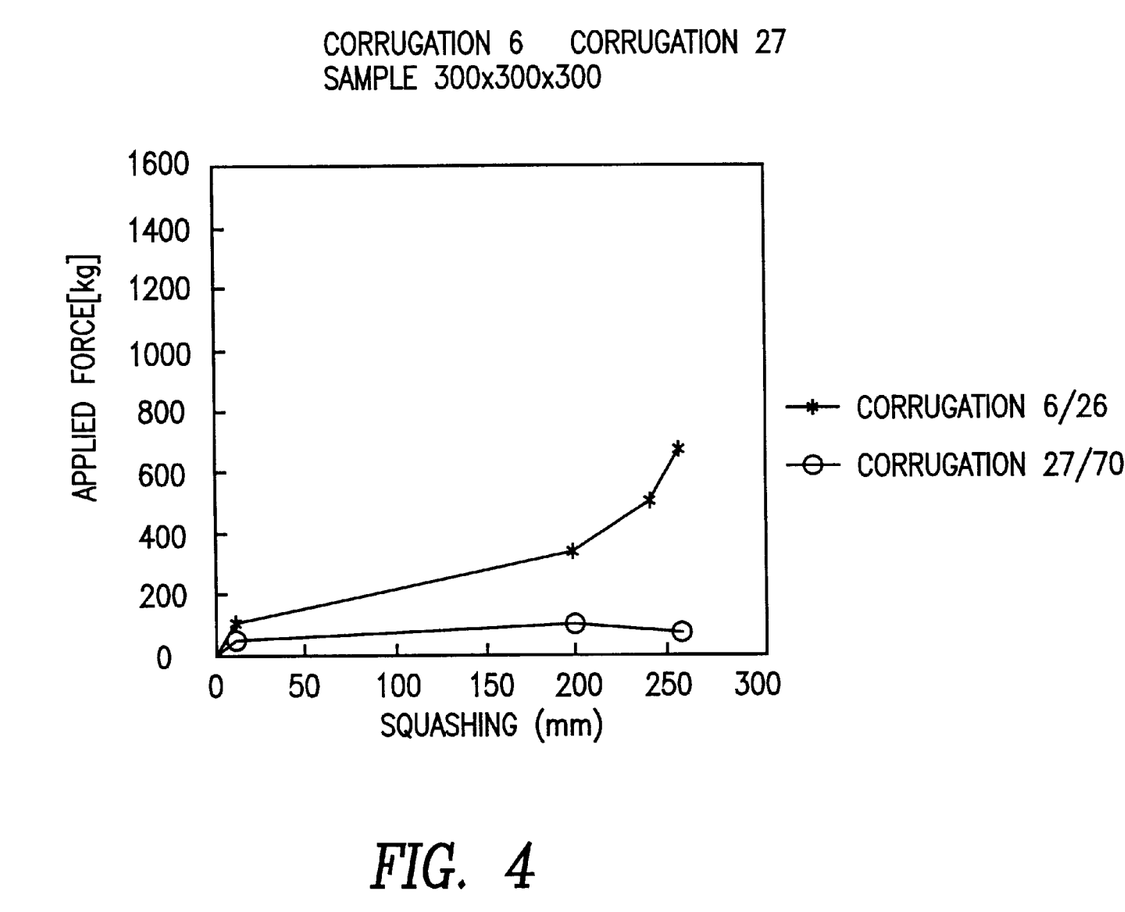
Figure 5:
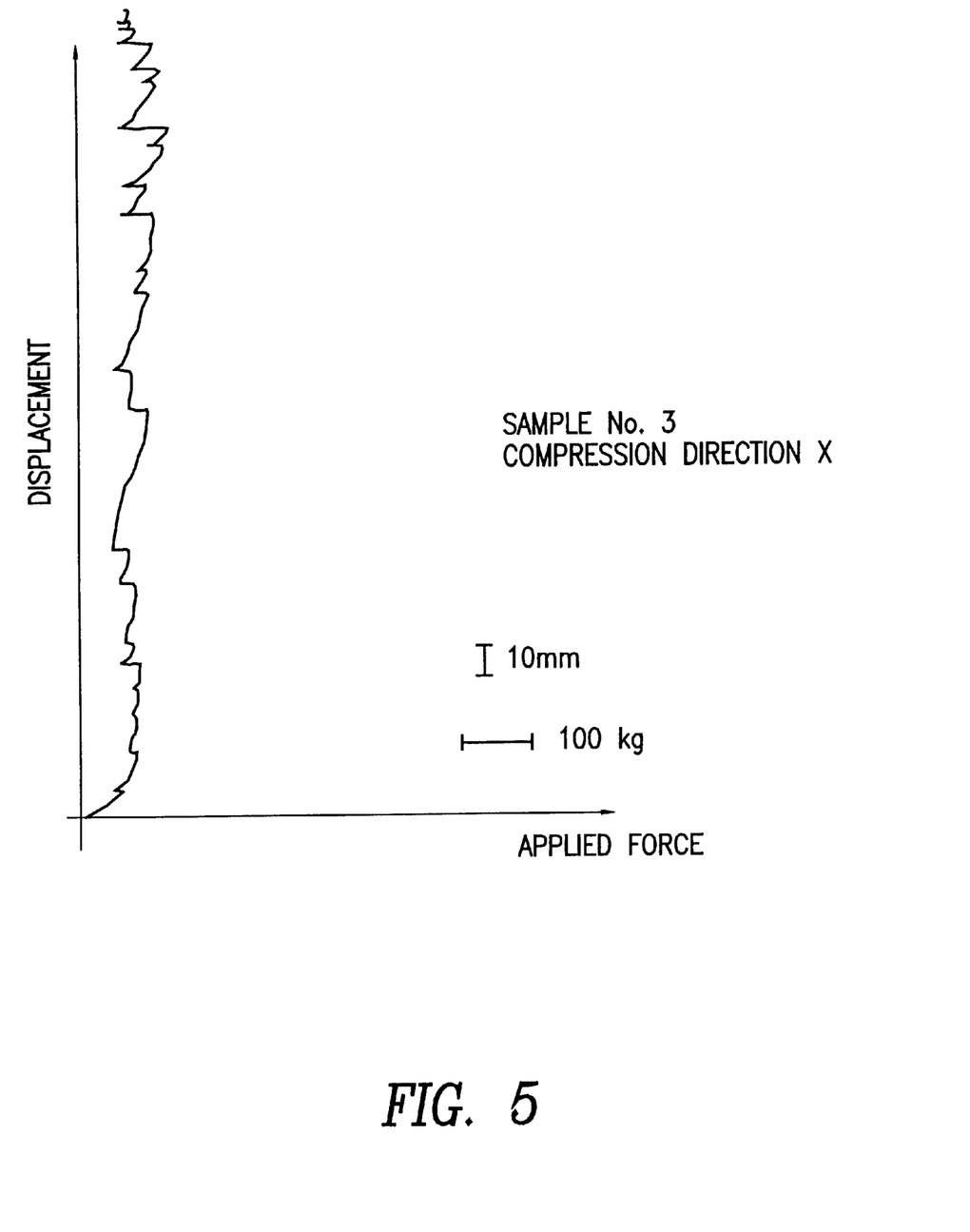
FIGS. 5 to 14 are diagrams derived from the dynamometer in quite static compression tests on samples of elements for impact absorption according to the invention, where in abscissae the applied force are specified and in ordinates the related displacement.
Figure 6:
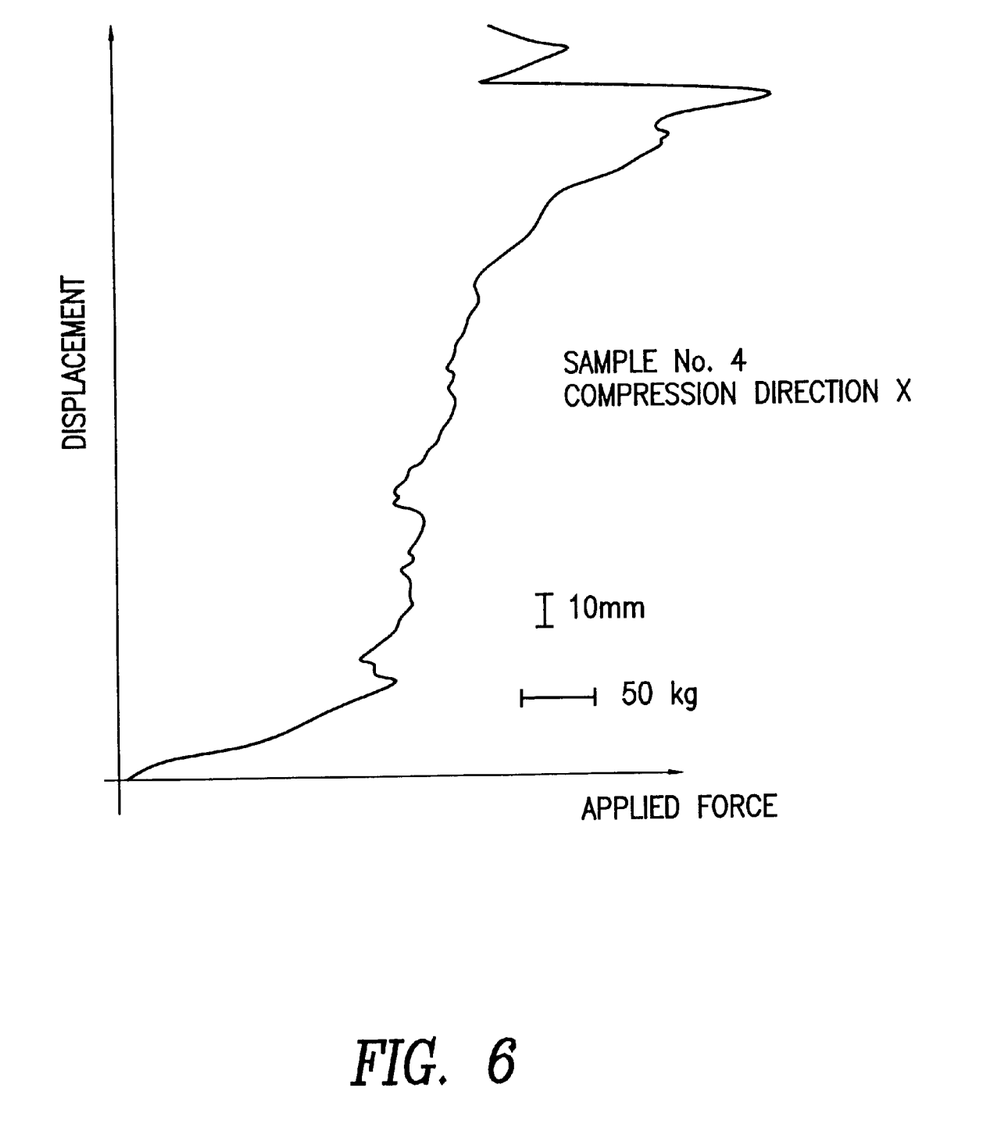
Figure 7:
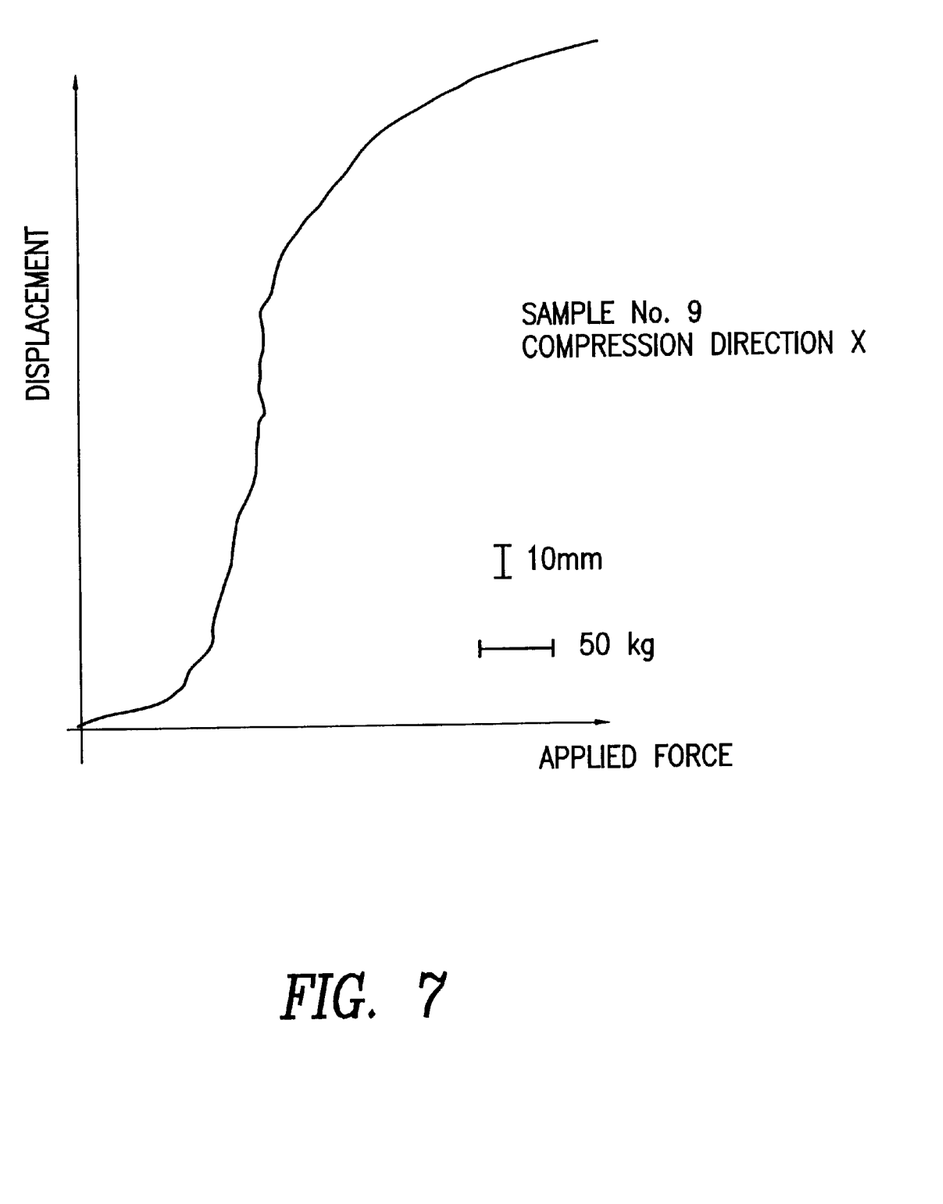
Figure 8:
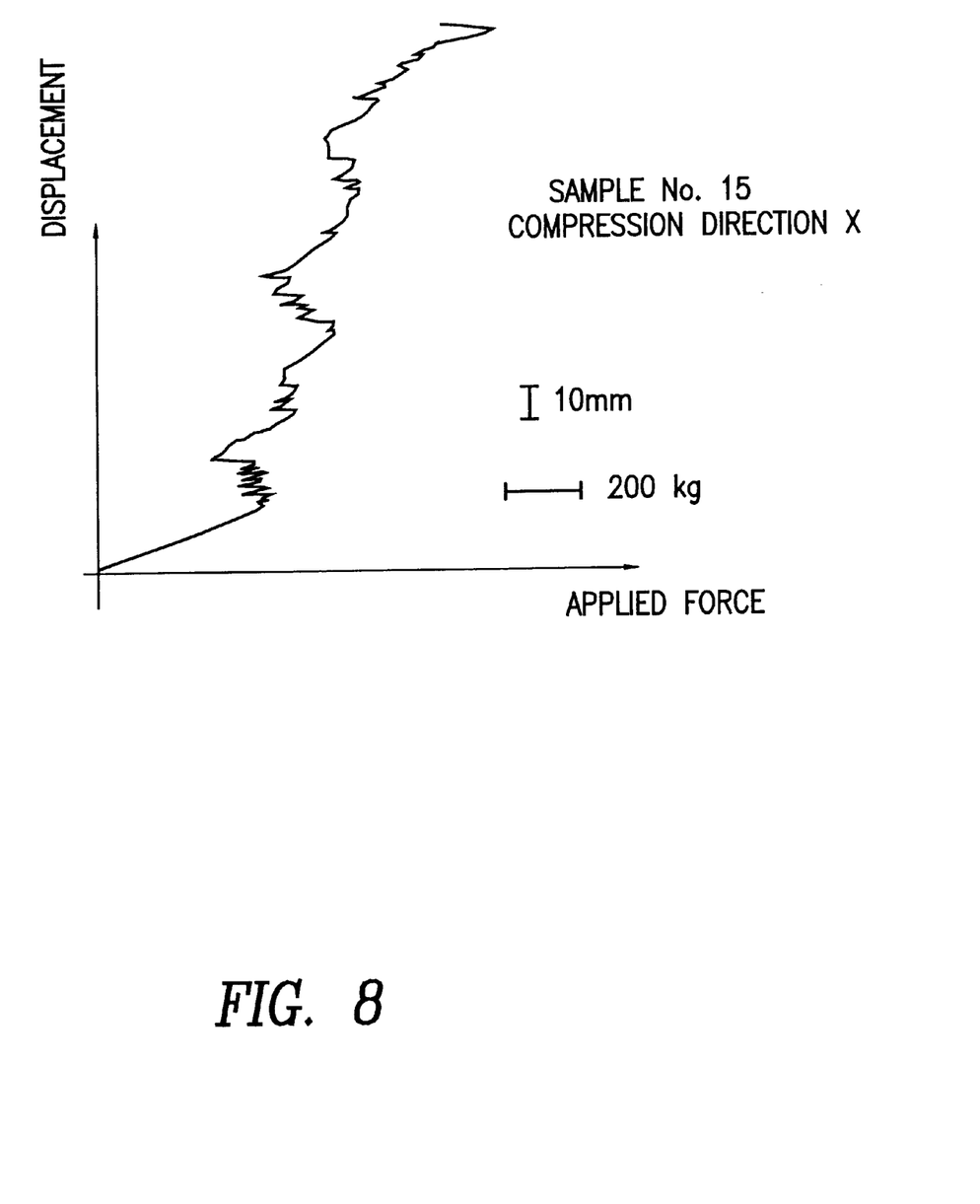
Figure 9:
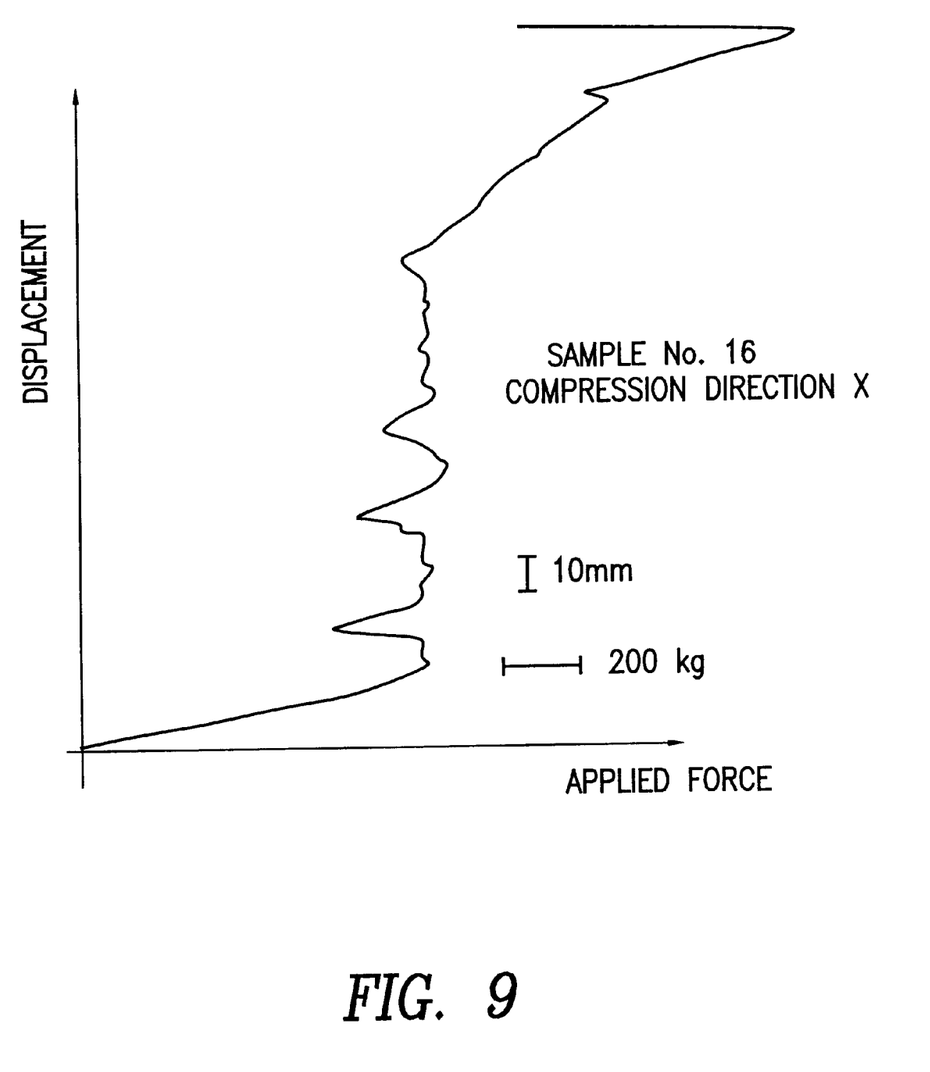
Figure 10:
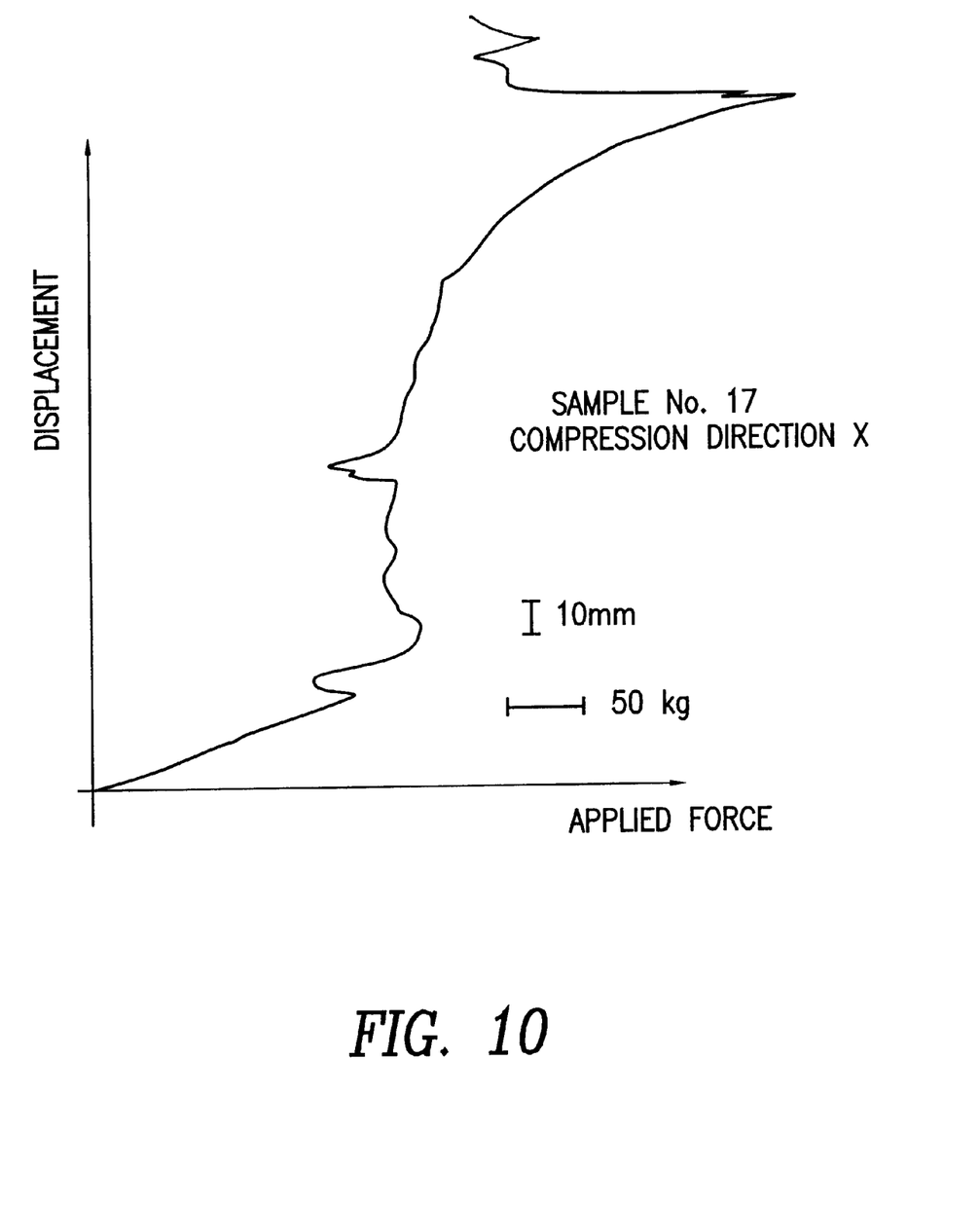
Figure 11:
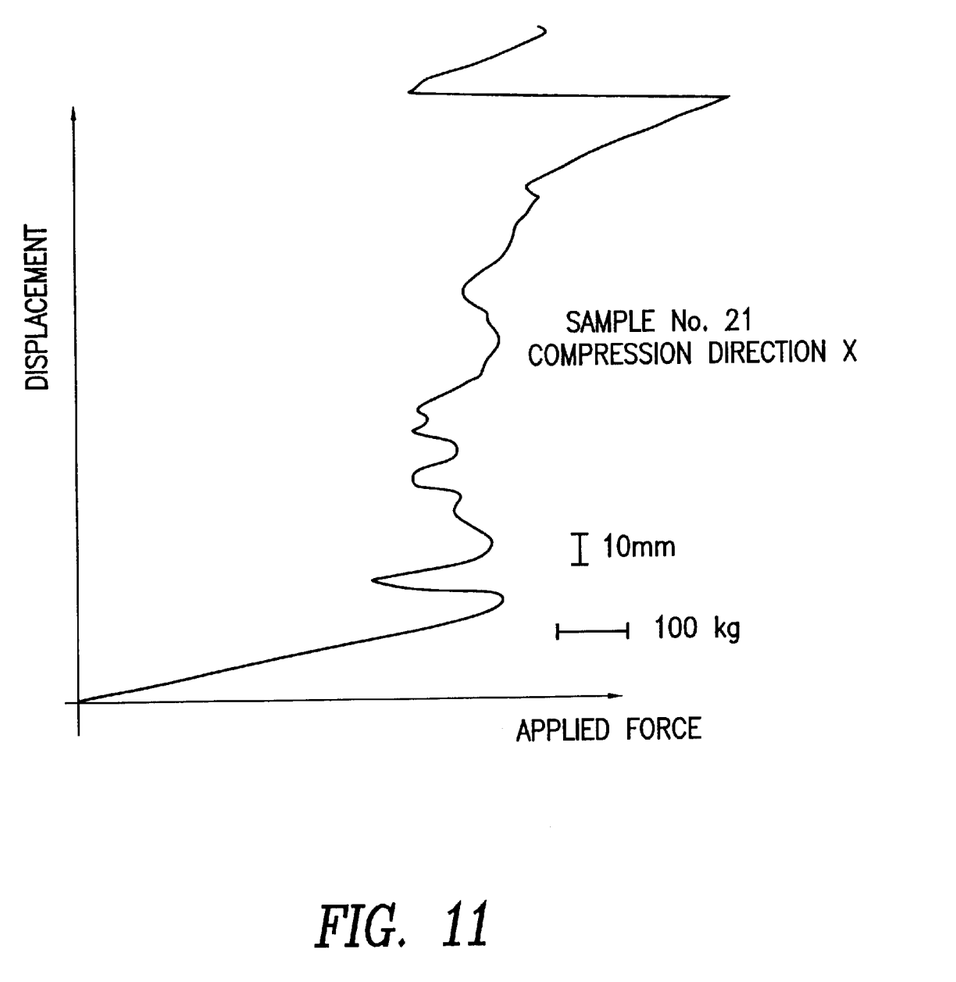
Figure 12:
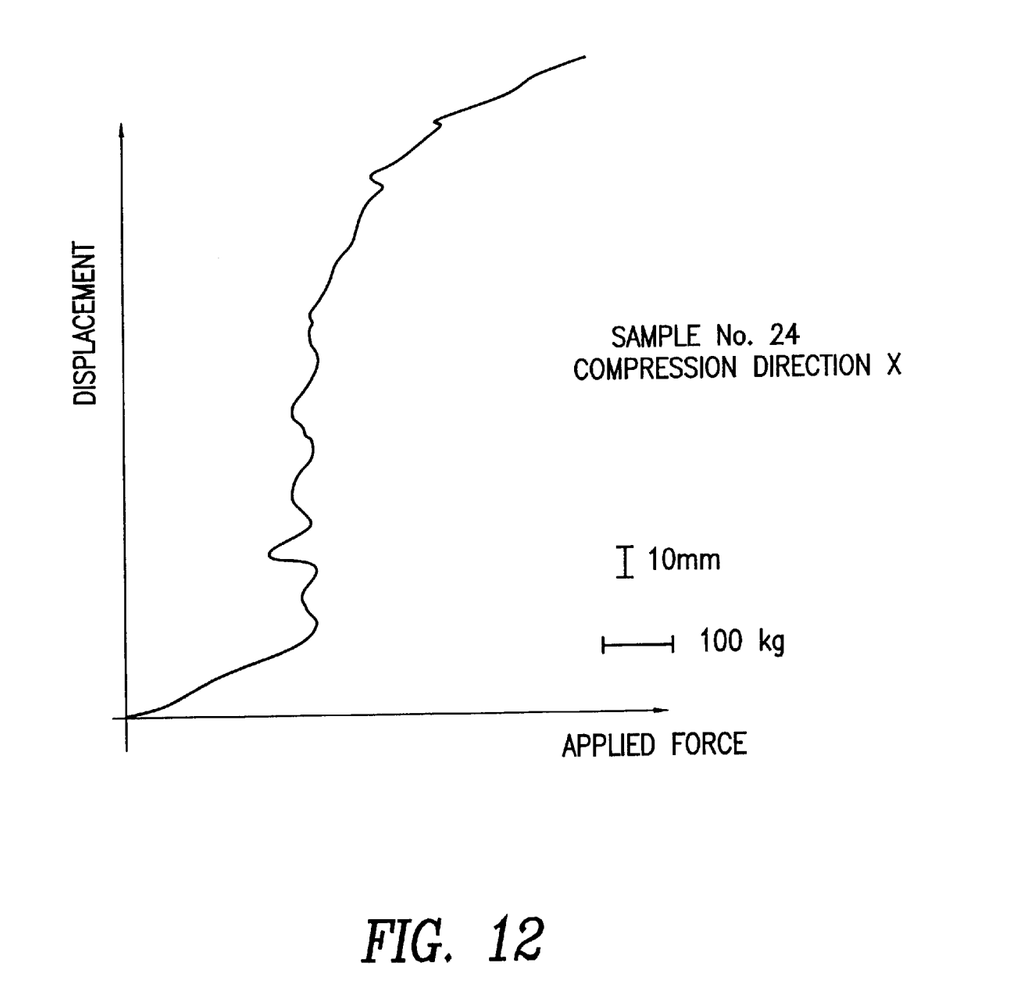
Figure 13:
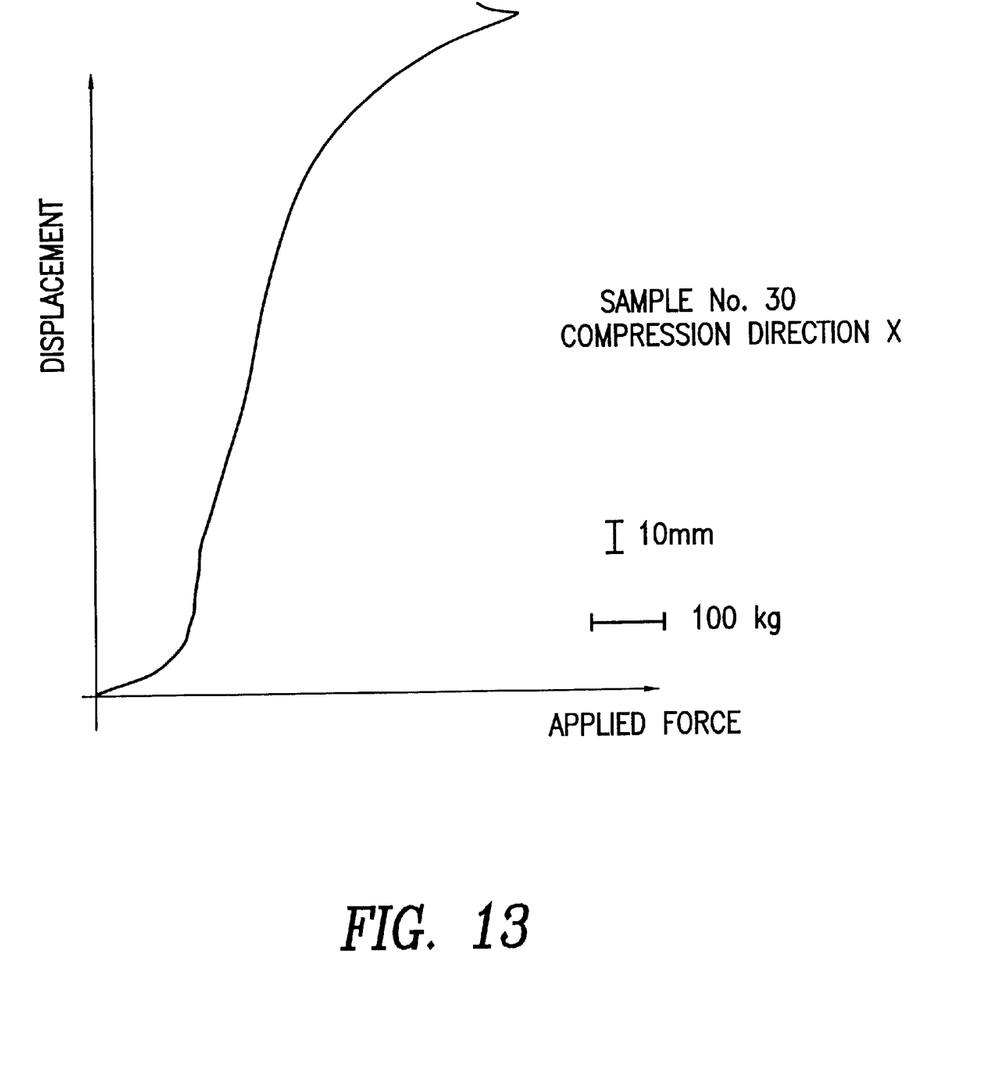
Figure 14:
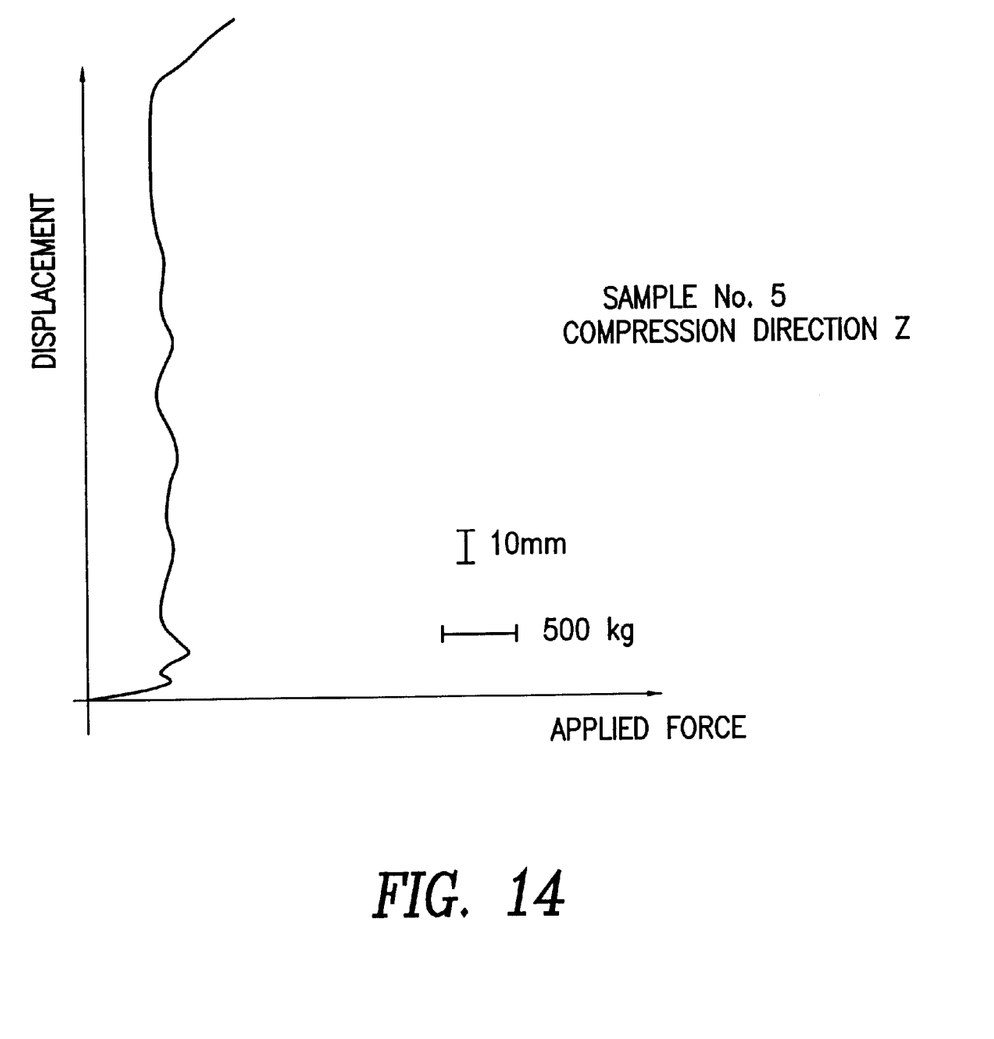

These diagrams are illustrated in the FIGS. 2 to 4, grouped for the dimension "corrugation".

The diagrams show a first linear part, that corresponds to the elastic yielding of the sample, followed by a part with a constant value, that corresponds to the situation where there is the yielding caused by the local instability of every single corrugation, that causes the progressive collapse of the sample with an almost constant force, followed at the end by a third part with a high gradient, that corresponds to the situation where all corrugations collapsed.

Figure 15:
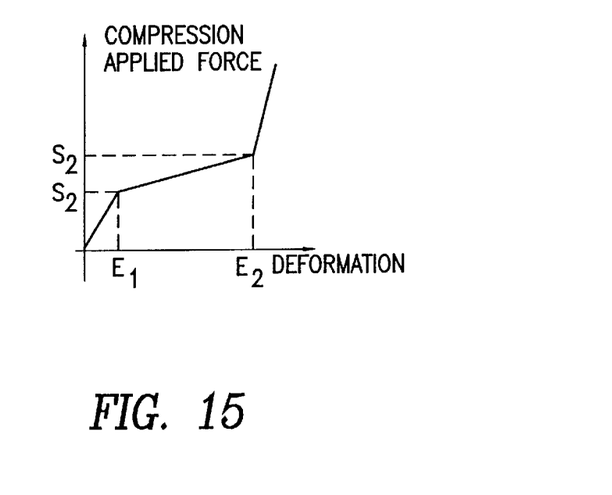
FIG. 15 is a diagram showing, in a general form, the results of the diagrams of FIGS. 2 to 4.

In order to estimate the ability to absorb energy because of deformation and to allow a preliminary comparison between the different geometries of the packets, a further schematic representation of the obtained curves is represented, in FIG. 15, where the packet deformation is specified in abscissae andthe related solicitation and compression in ordinates.

In the following table 2 the values s1 and s2 and E1 and E2 are represented, to be inserted in FIG. 15 for the different kinds of sheets.

TABLE 2

| SAMPLE | s1 kg/cm$^2$ | s2 kg/cm$^2$ | e1 % | e2 % | APPARENT DENSITY g/l |
|---|---|---|---|---|---|
| CORROG. 6/26 | 0.11 | 0.37 | 3 | 65 | 44 |
| CORROG. 13/26 | 0.20 | 0.33 | 10 | 60 | 25 |
| CORROG. 13/33 | 0.32 | 0.46 | 10 | 65 | 32 |
| CORROG. 13/50 | 0.61 | 0.78 | 7 | 65 | 45 |
| CORROG. 13/70 | 1.06 | 1.06 | 10 | 60 | 63 |
| CORROG. 20/26 | 0.05 | n.r. | 3 | >60 | 16 |
| CORROG. 20/33 | 0.10 | 0.22 | 3 | 70 | 21 |
| CORROG. 20/50 | 0.15 | 0.33 | 10 | 60 | 30 |
| CORROG. 20/100 | 0.54 | 0.93 | 7 | 60 | 63 |
| CORROG. 27/70 | 0.06 | n.r. | 3 | >70 | 44 |

Based on the derived data an estimate was made of the energy of impact that could be absorbed in the following simplified hypotheses:

1—the data related to the collapse solicitation, measured in the static tests, are taken into consideration;
2—the deformation of the material blocks, placed before a rigid barrier, is supposed to be till the 60% of their total thickness;
3—only impacts perpendicular to the barrier are taken into consideration.

In order to compare the differend kinds, the hypothesis is made that the deformation all samples can undergo in direction z, can be greater than 60% without the complete sample collapse, while the second parameter that is taken into consideration is the average value of collapse solicitation (S avg) at which the deformation energy is absorbed.

This average value is calculated, in a first approximation, as the average between s1 and s2 and, for the different tested samples, is illustrated in the following table 3.

TABLE 3

| Corrugation 13/70 | sm = 1.060 |
|---|---|
| Corrugation 20/100 | sm = 0.735 |
| Corrugation 13/50 | sm = 0.695 |
| Corrugation 13/33 | sm = 0.375 |
| Corrugation 13/26 | sm = 0.265 |
| Corrugation 20/50 | sm = 0.240 |
| Corrugation 6/26 | sm = 0.240 |
| Corrugation 20/33 | sm = 0.160 |
| Corrugation 27/70 | sm > 0.060 |
| Corrugation 20/26 | sm > 0.050 |

In the hypothesis of a vehicle with a mass equal to 780 kg, the kinetic energy for a speed of 100 km/h is: E=300,000 J while for a speed of 200 km/h is: E=1,200,000 J.

If the car is considered a rigid body, in order to obtain an average deceleration of 20 g, the average reaction of the barrier results to be of about: F avg=15600 kg=153000 N.

If the resistant area of the car is supposed to be equal to 15000 sq cm (600×2,500 mm) the collapse solicitation of the barrier must be S avg=15600/15000=1.04 kg/sq cm.

This value is almost equal to the value of the average collapse solicitation experimentally found in the best of the tested samples (corrugation 13/70).

In the hypothesis of an impact at 70 km/h, if the energetic efficiency of the barrier is 75% and in the hypothesis that it should absorb the 50% of the kinetic energy of the car, the sinking of the car into the barrier risults to be Y=300000× 0.5/0.75/138000=1.45 m.

If the compression of the barrier is considered equal to 60/70%, its local thickness should be equal to about 2–2.4 m. If then the thickness of the sheets used to realize the packets for impact absorption is increased, it is possible to obtain an increase of the average deceleration.

With the same calculation method it was verified that in the event of a body with a mass of 70 kg it is necessary, in order to obtain an average deceleration of 15 kg, a barrier with an average collapse solicitation equal to 0.33 kg/sq cm, corresponding to the results achieved for the kinds corrugation 13/33 and 13/26, while the total sinking, in case of impact at 70 km/h is equal to 0.85 m.

If the allowed average deceleration is increased to 20 g, the necessary collapse solicitation is S avg=0.44 kg/sq cm, while the calculated sinking is Y=0.65 m, that can be achieved through barriers with a thickness of about one meter.

Although the experiments were made with packets formed through the junction of corrugated sheets, it is clear that it is possible to use sheets with different shapes, for instance sheets that present a plurality of lenticular, frustum-pyramidal reliefs or other shapes.

In particular a geometry could be provided that allows the air to be entrapped in order to obtain partially closed rooms so that through the going out of the air a further energy absorption is obtained.

Instead, in some cases a closed rooms geometry can be provided.

In the same way, the use of barriers realized with the elements according to the invention shall not be limited to motor car courses but could be validly extended to other fields such as roads, ski tracks, and go-cart tracks.

An expert in this matter could then provide various other changes and variants that should however be considered included in the ambit of this invention.

I claim:

1. A segment of a crash barrier for stopping a moving vehicle or object, such as on a race track or course, the segment comprising:

a plurality of deformable plastic sheets, each sheet having a thickness of between about 0.26 mm and 1 mm;

a plurality of corrugations formed in each of the plurality of the plastic sheets, the corrugations being between about 6 mm and 27 mm;

means for joining the plurality of sheets together so that the segment has a total thickness of at least 1 meter and such that the plurality of corrugations of each of the plurality of sheets forms a plurality of cells with an adjacent plurality of corrugations on a second adjacent sheet, whereby when the plurality of sheets are impacted by the moving vehicle or object perpendicular to the plurality of corrugations, the sheets deform and absorb kinetic energy from the vehicle at a sufficient rate to safely stop the vehicle.

* * * * *